US012600464B2

(12) United States Patent　　　　(10) Patent No.: US 12,600,464 B2
Braid　　　　　　　　　　　　　　　(45) Date of Patent: Apr. 14, 2026

(54) CAVITY ACOUSTIC TONES SUPPRESSION

(71) Applicant: BAE SYSTEMS plc, London (GB)

(72) Inventor: Stephen Michael Braid, Brough (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 18/838,128

(22) PCT Filed: Feb. 8, 2023

(86) PCT No.: PCT/GB2023/050274
§ 371 (c)(1),
(2) Date: Aug. 13, 2024

(87) PCT Pub. No.: WO2023/156761
PCT Pub. Date: Aug. 24, 2023

(65) Prior Publication Data
US 2025/0145279 A1　　May 8, 2025

(30) Foreign Application Priority Data
Feb. 15, 2022　(GB) ..................................... 2202462

(51) Int. Cl.
B64C 23/06　　　(2006.01)
B64C 23/02　　　(2006.01)
B64D 1/06　　　(2006.01)

(52) U.S. Cl.
CPC ............. B64C 23/06 (2013.01); B64C 23/02 (2013.01); B64D 1/06 (2013.01)

(58) Field of Classification Search
CPC ............ B64C 2230/08; B64C 2230/24; B64C 23/005; B64C 2025/003; B64D 7/08
See application file for complete search history.

(56) References Cited

U.S. PATENT DOCUMENTS

| | | | |
|---|---|---|---|
| 2,749,064 A | 6/1956 | Kuhlman, Jr. | |
| 6,296,202 B1 * | 10/2001 | Stanek | ..................... B64D 1/06 |
| | | | 244/1 N |
| 6,513,754 B1 | 2/2003 | Grove | |

(Continued)

FOREIGN PATENT DOCUMENTS

| | | |
|---|---|---|
| CN | 110450942 B | 2/2025 |
| EP | 1257468 A2 | 11/2002 |

(Continued)

OTHER PUBLICATIONS

International Search Report dated Apr. 25, 2003 issued in PCT/GB2023/050274.
GB Search Report dated Aug. 12, 2022 issued in GB 2202462.4.

*Primary Examiner* — Nicholas McFall
*Assistant Examiner* — Eric Acosta
(74) *Attorney, Agent, or Firm* — Scully, Scott, Murphy & Presser, P.C.

(57) ABSTRACT

A cavity system for use on a vehicle is provided. The cavity system comprises a cavity having at least one of a front edge and a rear edge arranged orthogonally to the actual or intended direction of travel of the vehicle, and longitudinal edges. The front and/or rear and longitudinal edges define an opening. The cavity system also comprises at least one shock stabiliser protruding from a surface adjacent each longitudinal edge of the cavity into the ambient flow outside of the cavity. An aircraft comprising the cavity system is also provided.

20 Claims, 5 Drawing Sheets

(56) References Cited

U.S. PATENT DOCUMENTS

| | | | |
|---|---|---|---|
| 10,017,250 B2 * | 7/2018 | Colosimo | ............... E05D 15/02 |
| 2008/0203218 A1 | 8/2008 | Anderson et al. | |
| 2009/0045289 A1 * | 2/2009 | Bilanin | ................. B64C 23/005 |
| | | | 244/130 |
| 2011/0095135 A1 | 4/2011 | Miller et al. | |
| 2015/0225069 A1 * | 8/2015 | Lacy | ....................... B64C 23/06 |
| | | | 244/1 N |
| 2016/0031386 A1 | 2/2016 | Patience | |
| 2016/0031549 A1 | 2/2016 | Patience | |
| 2016/0288632 A1 | 10/2016 | Sinha et al. | |
| 2021/0354823 A1 | 11/2021 | Cushing et al. | |

FOREIGN PATENT DOCUMENTS

| | | | |
|---|---|---|---|
| EP | 1967449 A2 | 9/2008 |
| GB | 2514453 A | 11/2014 |
| JP | H0211495 A | 1/1990 |
| WO | 01/62592 A1 | 8/2001 |
| WO | 2004089741 A1 | 10/2004 |
| WO | 2021214445 A1 | 10/2021 |

* cited by examiner

CAVITY ACOUSTIC TONES SUPPRESSION

FIELD OF THE INVENTION

The present invention relates to a cavity system for use on a vehicle. Example vehicles include aircraft, and therefore example cavities include cavities in bays such as weapons bays and landing gear bays.

BACKGROUND

When a cavity is moving in ambient fluid, for example when an aircraft bay is moving in air, a shear layer is formed between the moving ambient air and the static air in the cavity (from the reference point of the aircraft). A shear layer is a thin region of concentrated vorticity across which the tangential velocity component varies greatly; it is positioned across the top of the bay and separates high speed and low speed flow. A vortex is shed from the cavity leading edge and grows as it travels down the shear layer and impacts on the aft (trailing) wall of the bay resulting in the emission of noise. Also, the acoustic wave travels back upstream inside the bay. The fluctuating pressure of the acoustic wave may either result in vortices being shed from the leading edge cavity lip or an increase in the growth rate of the vortices such that a series of vortices is formed down the shear layer at a preferential rate which is related to the frequency of the upstream acoustic wave. The vortices grow into large-scale structures as they propagate downstream in the shear layer and then impact the aft (trailing) wall of the bay at a characteristic rate. This results in acoustic noise being generated at a characteristic rate that may be described as acoustic tones of a characteristic frequency.

Similar problems are found in other types of vehicles, such as high performance cars having open roofs or windows, or ships at sea with open hatches where the impinging wind speed is high.

It is known in aircraft to employ spoiler arrangements to divert the airflow over and beyond the cavity, i.e. over and beyond any boundary layer or prospective shear layer so that the above-described effects do not take place. These spoilers are deployed either in front of or across the cavity.

It has been realised that cross-flow (i.e. transverse or lateral flow) also has an effect on acoustic noise in cavities, and is not mitigated using existing spoiler designs.

Therefore, there is a need for a lightweight palliative mechanism for reducing or controlling the effect of acoustic noise in cavities caused by cross-flow.

SUMMARY OF THE INVENTION

According to a first aspect, there is provided a cavity system for use on a vehicle, comprising:

a cavity having at least one of a front edge and a rear edge arranged orthogonally to the actual or intended direction of travel of the vehicle, and longitudinal edges, the front and/or rear and longitudinal edges defining an opening; and at least one shock stabiliser protruding from a surface adjacent each longitudinal edge of the cavity into the ambient flow outside of the cavity.

Advantageously, the cavity system tends to reduce the effect of cross-flow impinging on a cavity as it moves through a fluid, or as a fluid moves across it, by causing the shear layer to be raised out of the cavity. Therefore, noise within the cavity and consequently damage caused tends to be reduced. Further, the cavity system allows payload release characteristics to be better predicted beyond the shear layer. The latter is achieved by creating a thick enough shear layer that reduces the flow velocity around any geometries or payloads within the cavity preventing them from interacting with the jettisoned/released payload beyond the cavity. Further, the shock stabilisers generate a series of fixed shocks as opposed to "transient shocks" which move along the direction of travel of the cavity. Transient shocks make it hard to predict the loads on the jettisoned/released payload. Hence, there is a need to washout/eliminate these with fixed shocks, which are consistent in position, increasing the predictability of the loads on the jettisoned/released payload or reducing the range of possible load solutions.

The longitudinal edges may be parallel with the actual or intended direction of travel of the vehicle.

The cavity system may comprise a bay having a front wall, rear wall and at least one side wall, the upper surfaces of which respectively comprising the front edge, the rear edge and the longitudinal edges. There may be one continuous side wall, or two side walls coupled by way of a base. The bay may be a rotary payload bay. Alternatively, the bay may be a fixed payload bay having at least one hinged door across the opening.

The at least one shock stabiliser may protrude from an upper surface of the at least one side wall. Alternatively, the at least one shock stabiliser may protrude from the skin of a vehicle surrounding the cavity. Alternatively again, the cavity system may comprise first and second spoilers arranged along the longitudinal sides of the cavity, wherein one or more of the plurality of shock stabilisers are arranged on an upper surface of each spoiler.

Each shock stabiliser may comprise a plurality of peaks. The peaks may be pointed tips.

The at least one shock stabiliser may comprise an inboard surface facing toward the cavity, and first and second outboard surfaces facing generally away from the cavity, wherein the first and second outboard surfaces are inclined relative to each other about the horizontal axis of the shock stabiliser, the first and second outboard surfaces being coupled to respective edges of the inboard surface.

At least a portion of the inboard surface may abut a vertical plane through the longitudinal edge of the cavity. The inboard surface may be coplanar with the vertical plane through the longitudinal edge of the cavity.

The first and second outboard surfaces may be inclined relative to each other about the horizontal axis and vertical axis of the shock stabiliser. The inboard surface may be a trapezoid or a triangle.

The inboard surface may be arranged in parallel with the longitudinal edge of the cavity. Alternatively, the inboard surface may be angled relative to the longitudinal edges of the cavity such that a distance between the inboard surface and the cavity increases with distance along the shock stabiliser. The inboard surface may be arranged vertically. Alternatively, the inboard surface may be arranged at an angle relative to the vertical plane.

The cavity system may comprise a third outboard surface disposed between the first and second outboard surfaces. The third outboard surface may be rectangular, square, or trapezoidal in shape.

The at least one shock stabiliser may comprise a linear upper edge angled towards the base of the shock stabiliser, such that the height profile of the shock stabiliser reduces along its length. Instead of a linear upper edge, the shock stabiliser may comprise a pointed tip. The shock stabiliser may be pyramidal in shape.

The at least one shock stabiliser may comprise a linear upper edge angled away from the vertical plane passing through the edge of the cavity, such that the upper edge increases in separation from the longitudinal edge of the cavity along its length. The linear upper edge may be angled away from both the vertical plane and towards the base of the shock stabiliser.

The upper edge of the at least one shock stabiliser and the longitudinal edge of the cavity may be arranged such that an angle of between 5 degrees and 45 degrees is formed between them. More preferably, an angle of between 10 degrees and 25 degrees is formed between the upper edge of the at least one shock stabiliser and the longitudinal edge of the cavity. More preferably again, an angle of between 15 degrees and 20 degrees is formed between the upper edge of the at least one shock stabiliser and the longitudinal edge of the cavity.

The upper edge of the shock stabiliser may be arranged obliquely with the bottom edges of the inboard surface and the third outboard surface, such that the third outboard surface and the inboard surface are twisted about the vertical axis.

The at least one shock stabiliser may comprise an inboard surface facing toward the cavity, an outboard surface facing generally away from the cavity, a front surface facing toward the actual or intended direction of travel of the vehicle, and a rear surface facing away from the actual or intended direction of travel of the vehicle, wherein the front surface is concave in profile such that the shock stabiliser forms a ramp to oncoming fluidic flow in the actual or intended direction of travel of the vehicle. The front surface may be orientated such that it faces the actual or intended direction of travel of the vehicle at an angle of between 5 and 20 degrees. More preferably, the front surface may be orientated such that it faces the actual or intended direction of travel of the vehicle at an angle of between 5 and 10 degrees.

The cavity system may comprise a transverse spoiler arranged across or in front of the cavity relative to the actual or intended direction of travel of the vehicle.

The cavity system may comprise a motor for driving the at least one shock stabiliser to ascend from or descend into the surface adjacent the cavity longitudinal edge. The surface may comprise at least one recess for receiving the at least one shock stabiliser. The recesses may have a cover to close them when the at least one shock stabiliser is retracted.

Alternatively, the cavity system may comprise a motor and the at least one shock stabiliser may comprise a hinge coupled in proximity to the longitudinal edge of the cavity, wherein the motor is arranged to drive the at least one shock stabiliser to rotate about the hinge to be positioned in the ambient flow when in use. A plurality of shock stabilisers may be provided with a single hinge, i.e. a plurality of shock stabilisers may be joined together by way of the hinge.

The at least one shock stabiliser may be between 2 cm and 20 cm tall. The at least one shock stabiliser may be between one boundary layer thickness and six boundary layer thicknesses tall. Preferably, the at least one shock stabiliser is between 3 cm and 15 cm tall. More preferably, the at least one shock stabiliser is between 4 cm and 12 cm tall. More preferably, the at least one shock stabiliser is between 5 cm and 10 cm tall.

The cavity system may comprise between three and six shock stabilisers disposed on either side of the cavity. Preferably, the cavity system comprises four shock stabilisers arranged on either side of the cavity.

The shock stabilisers may be arranged in pairs, wherein one shock stabiliser in each pair of shock stabilisers is arranged on the opposite side of the cavity to the other. In other words, the cavity system may comprise a plurality of pairs of shock stabilisers, with shock stabilisers within each pair arranged on opposite sides of the cavity. Both shock stabilisers within a pair may be located at an equidistant position from an end of the longitudinal edge of the cavity. Alternatively, the pairs of shock stabilisers may be staggered along the length of the cavity, such that a first one of each pair is a first distance from the end of the longitudinal edge and a second one of each pair is a second distance from the end of the longitudinal edge. Each of the pairs of shock stabilisers may be spaced apart equidistantly.

The cavity system may comprise a releasable payload. The releasable payload may be an ordinate, such as a bomb or a missile.

According to a second aspect, there is provided an aircraft comprising the cavity system according to any one of the preceding claims. The cavity may be a weapons bay.

It will be appreciated that features described in relation to one aspect of the present disclosure can be incorporated into other aspects of the present disclosure. For example, an apparatus of the disclosure can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent.

BRIEF DESCRIPTION OF THE DRAWINGS

Embodiments will now be described, by way of non-limiting example, with reference to the accompanying drawings, in which.

Throughout, the same reference numerals are used to denote features having similar purpose.

DETAILED DESCRIPTION

It will be appreciated that relative terms such as horizontal and vertical, top and bottom, above and below, front and back, and so on, are used above merely for ease of reference to the Figures, and these terms are not limiting as such, and any two differing directions or positions and so on may be implemented rather than truly horizontal and vertical, top and bottom, and so on. In particular, for convenience, in FIG. 1 a cavity is shown with it opening at the top of the page, and so for convenience the word "top" is used to mean the opening of the cavity, and the word "above" means further away from the cavity. However, it will be appreciated that the present disclosure refers also to cavities positioned for example underneath the wing or fuselage of e.g. an aircraft, i.e. upside down to that shown in FIG. 1, but the description use of the word "top" will still refer to the opening part of the cavity and that of the word "above" will still refer to being away from the cavity.

Generally, embodiments relate to the use of shock stabilisers to reduce the effect of cross-flow (i.e. air flow across the cavity, orthogonal to the direction of travel of the cavity). These shock stabilisers are positioned along the longitudinal sides of the cavity rather than at its front or rear (i.e. they are not positioned across the ends of the cavity).

Figure 1:
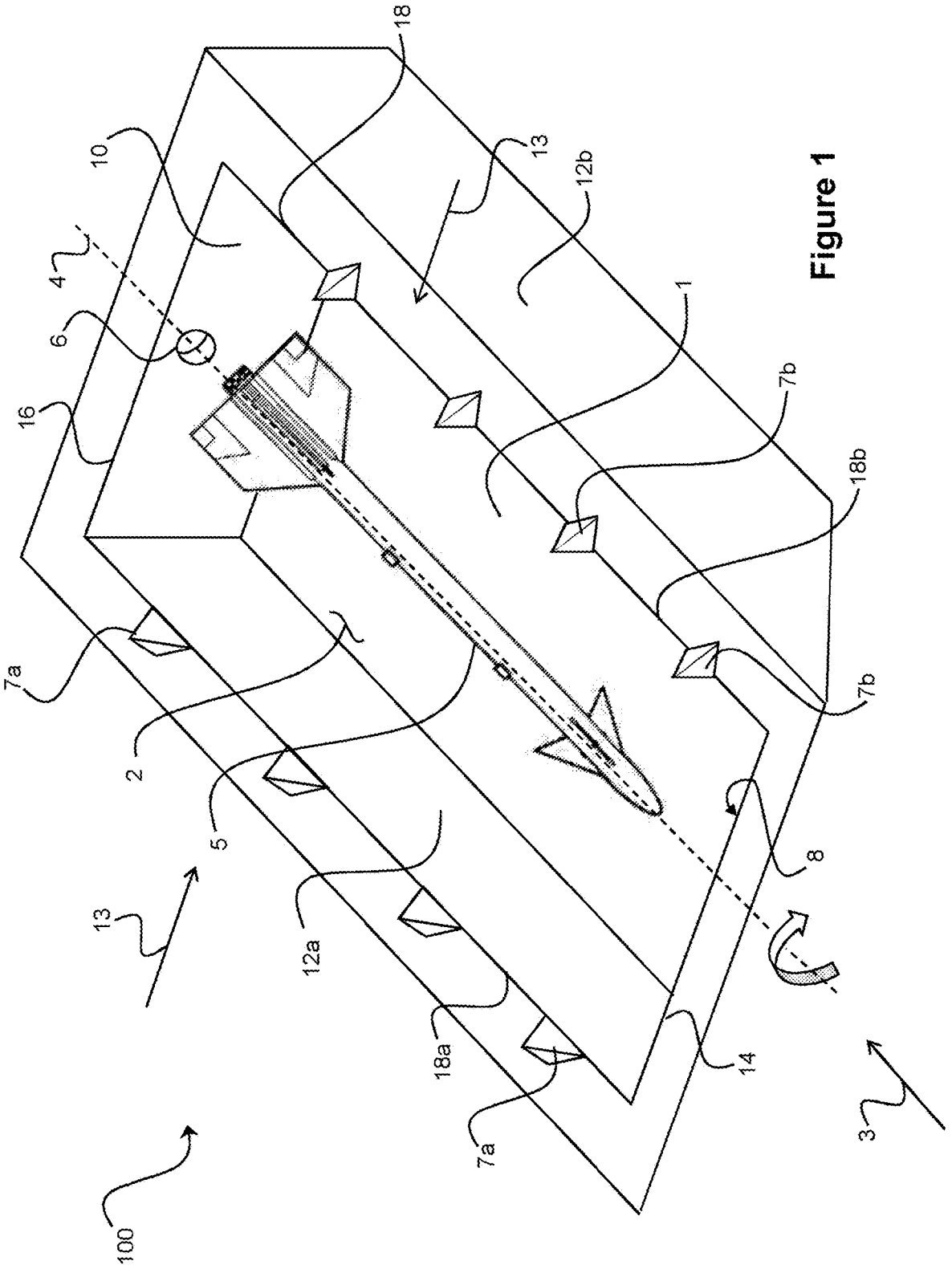
FIG. 1 is a perspective view (not to scale) of a rotary payload bay having a shock stabilisation system according to embodiments.

FIG. 1 is a perspective view of bay 100 (specifically a payload bay) having pairs of shock stabilisers 7a, 7b (generally 7) according to an embodiment. Each one in a pair of shock stabilisers 7a, 7b is disposed on the opposite side of the bay 100 to the other shock stabiliser 7a, 7b in the pair. Each shock stabiliser 7a, 7b may be directly opposite its partner shock stabiliser 7a, 7b or offset from it along the length of the bay 100. There may be an odd number of shock stabilisers 7a, 7b i.e. on shock stabiliser 7a, 7b may be without a partner.

While a bay 100 for containing a payload 5 such as a missile or camera system is illustrated, it would be appreciated that in use the bay 100 may be empty, or may be a depression in a structure. The payload 5 may be a deployable payload, or ordinate, that is released from the bay 100.

The bay 100 comprises a cavity 2. The cavity 2 is defined by the inside surface of walls of bay 100. In use, the bay 100 moves through a fluid (e.g. air), and therefore a fluidic main flow 3 acts in the opposite direction to the actual or intended direction of movement of the bay 100. The bay 100 comprises, defined relative to the actual or intended direction of main flow 3, a leading (i.e. front) wall 8, an aft (trailing) wall 10, and two side walls 12a, 12b (generally 12). In the illustrated embodiment, the cavity 2 comprises a rectangular planar base 1 and has a rectangular opening (i.e. aperture). The side walls 12 and aft wall 10 are perpendicular to the planar base 1, while the front wall 8 is slanted relative to the base 1 such that the opening has a greater perimeter than the perimeter of the base 1. Each wall 8, 10, 12 respectively comprises an upper surface, one edge of each of which defines the leading edge 14, trailing edge 16, and side edge 18a, 18b (generally 18) of the cavity 2, i.e. the edges 4, 16, 18 of the cavity 2 define the opening of the cavity 2. The upper surfaces of each of the walls 8, 10, 12 are co-planar.

While in the illustrated embodiment the side walls 12 are shown as being longer than the front and rear walls 8, 10, this may not be the case in other embodiments. For example, the cavity 2 may be relatively wide transverse (i.e. orthogonally) to the direction of the main flow 3. In these embodiments, following reference to the "longitudinal edges" should be translated to the "lateral edges", i.e. those edges parallel with the direction of the main flow 3. The bay 100 is a rotary bay having an axis of rotation 4. In the illustrated embodiment, the axis of rotation 4 is aligned with the central longitudinal axis of the bay 100. In other embodiments, the bay 100 may rotate about an axis offset to one side of the bay 100, for example, along the side edge 18 of the bay 100.

Figure 2A:
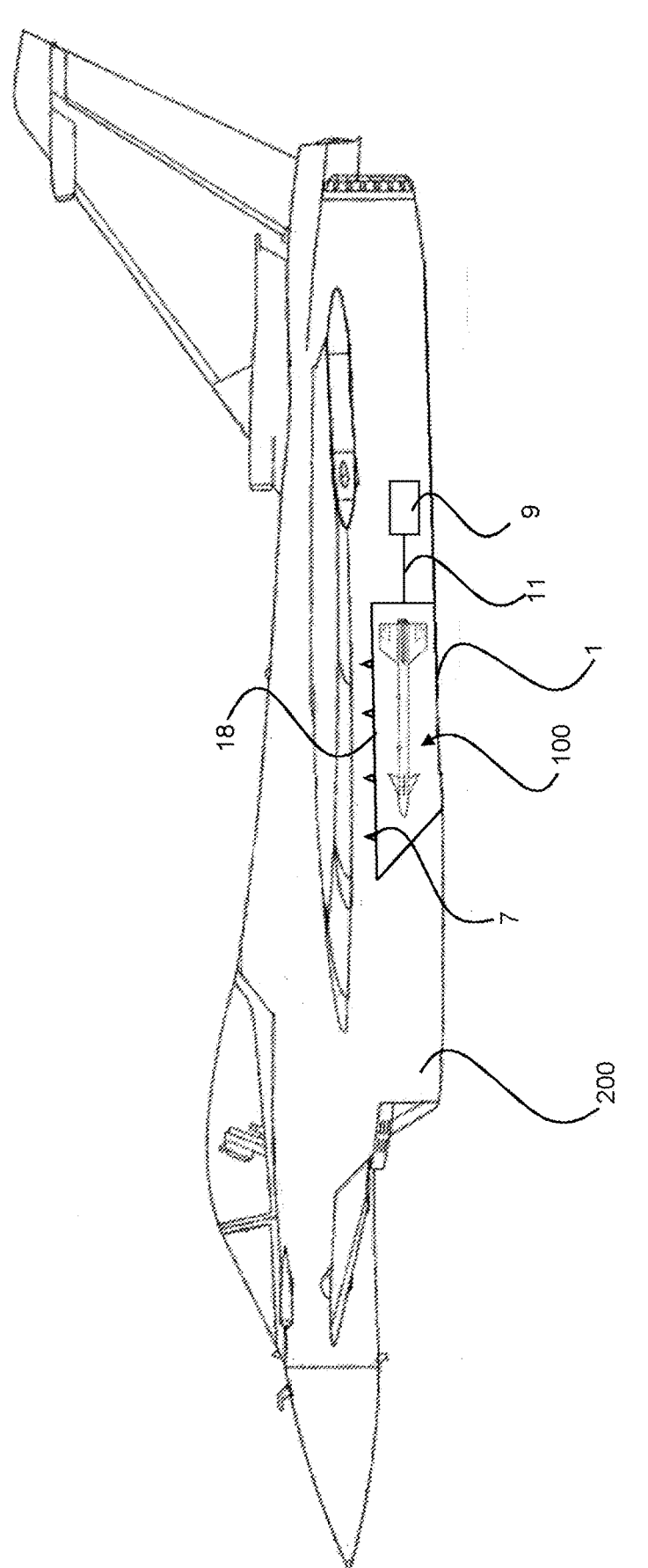
FIG. 2a is a schematic illustration of an aircraft having the rotary payload bay of FIG. 1 in a closed configuration.
Figure 2B:
FIG. 2b is a schematic illustration of an aircraft having the rotary payload bay of FIG. 1 in an open configuration.

The bay 100 is driven to rotate about a pivot point 6 through which the axis of rotation 4 passes. As illustrated in FIGS. 2a and 2b, the bay 100 may be driven to rotate by a motor 9. The bay 100 rotates in order to expose the payload 5 to the ambient flow (e.g. ambient airflow).

In use, there will be a cross-flow 13 acting on the bay 100. The cross-flow 13 is illustrated as being orthogonal to the actual or intended direction of travel of the bay 100 for the purpose of defining shapes and angles of bay 100 components; i.e. the cross-flow 13 is illustrated as being orthogonal to the main flow 3. However, in reality cross-flow will approach the bay 100 through a range of angles.

In the illustrated embodiment, four shock stabilisers 7 are arranged to protrude from each side of the bay 100, into the surrounding ambient flow in use. The shock stabilisers 7 are disposed on (i.e. protrude from, are affixed to, or are integrally formed with) the upper surface of the side walls 12. Alternatively, the shock stabilisers 7 may be arranged on a structure which is itself disposed on the upper surface of the side walls 12, such as an elongate spoiler. In other words, the shock stabilisers 7 are arranged on either side of an axis passing through the centre of the cavity 2 parallel with the direction of the main flow 3. The shock stabilisers 7 are not arranged forward of the cavity 2, as defined by the front edge 14.

In the illustrated preferable embodiment, the shock stabilisers 7 are arranged such that one side of each is parallel with the side edges 18 of the bay 100. In other embodiments, the shock stabilisers 7 are offset from the side edges 18 of the bay 100. For example, the shock stabilisers 7 may be positioned such that the gap between their closest point to the cavity 2 and the cavity edge 18 is between 0.01 and 0.75 times the width of the cavity 2. The gap between the shock stabilisers' closest point to the cavity 2 and the cavity edge 18 is preferably less than 0.5 times the width of the cavity 2.

As the shock stabilisers 7 interact with high-energy flows when installed in a fighter aircraft 200, suitable construction materials include titanium, steel or a composite such as carbon fibre composite. The shock stabilisers 7 may be made of the same material as the skin of the vehicle into which the bay 100 is installed (or into which the cavity opening is cut out). Where the bay 100 is installed in an environment with reduced flow velocity and energy, for example a low-performance car, materials that are not renowned for their strength or life properties, such as plastic, could be used.

Further shock stabiliser 7 designs will be later described with reference to FIGS. 3a-d. In FIG. 1, the shock stabiliser 7 takes the form of a pyramid having a triangular base, i.e. a right-angled pyramid. One side (i.e. edge) of the triangular base is arranged in parallel with the edge 18 of the cavity 2. A generally vertical (relative to the surface to which the shock stabiliser 7 is fixed or otherwise attached) triangular panel is arranged such that an outer surface of which faces toward the cavity 2 (i.e. faces the edge 18 of the cavity 2), connected to one side of the triangular base. In other words, the triangular panel is illustrated as being co-planar with the inner surface of the side wall 12 of the cavity 2. Two further triangular panels (i.e. panels in the form of right-angled triangles) are connected to the two remaining sides of the triangular base. These two further triangular panels are inclined towards the cavity 2 to connect to the first triangular panel on the side facing the cavity 2 and each other. The shock stabiliser 7 may be open at the bottom, such that the "base" described above is the perimeter of an opening.

The two triangular panels generally facing towards the impinging cross-flow 13 (i.e. away from the cavity 2) are preferably arranged at an angle of between 15 and 70 degrees to the cross-flow 13. In other words, the triangular base preferably has a side parallel to the edge 18 of the cavity, and two further edges arranged at between 20 and 75 degrees to that side.

The height of the shock stabiliser 7 is preferably between 4 cm and 20 cm tall, and preferably between 6 cm and 12 cm tall. The width and depth of the shock stabiliser 7 are preferably in the range of between 2 cm and 20 cm. The shock stabilisers 7 may have a profile thickness that can be constant, tapered or irregular.

A pinnacle (i.e. a pointed tip) at the top of the shock stabiliser 7 tends to increase cavity 2 flow, via means of inducing vortical flow. The latter tends to help to suppress acoustic effects of the shear layer. Flow mixing is the introduction of a new flow component with different direction, circulation and or energy to the existing flow structure.

The shock stabiliser 7 utilises the energetic cross-flow 13 to energise the shear layer and generate a shock at the foot (i.e. base) of the shock stabiliser 7. Hence, it is advantageous to increase the surface area of the shock stabiliser 7 facing towards impinging cross-flow 13 relative to the surface facing toward the cavity 2.

Shock stabilisers 7 in described embodiments are essentially vortex generators. Vortex generators are traditionally used to maintain an area of attached flow to support control surfaces of a vehicle (i.e. whereby the boundary layer has a positive velocity profile coming from the surface to freestream flow). These have not been considered to support mixing within cavity 2 flow systems. The shock stabilisers 7 induce fixed shocks which tend to re-position the shear layer to a greater height above the cavity 2 and stabilises an area of unsteady flow (i.e. the shear layer is moved away from intruding into the cavity 2). Unsteady flow is highly non-linear and turbulent flow. The fixed shocks tend to make the effect of unsteady flow systems beyond the shear layer more uniform and consistent. In turn, this allows for better prediction of the flow effects on payloads 5 in the cavity 2 or structures neighbouring the cavity 2.

In addition, these shock stabiliser 7 systems tend to reduce the influence of transient shocks on the payload 5 immediately following ejection from the cavity 2 by either eliminating the transient shock or limiting their movement. Shock stabilisers 7 introduce shocks at a constant position relative to the plane of the opening of the cavity 2, with the desired effect to either eliminate transient shocks or overpower them, to ensure they have little effect on the jettisoned payload 5.

The shocks generated by the shock stabilisers 7 have a constant position within the volume above the cavity 2. Therefore, a released payload 5 interacts with the shocks generated by the shock stabilisers 7 at a known positon within the flow volume. Without shock stabilisers 7, expansions (a form of shock, where flow is accelerated as opposed to a compression where flow is deaccelerated) may emanate from the undulation of the shear layer, which may transition in the horizontal plane (i.e. across the cavity 2 opening). Hence, these perturbations/oscillations or even transient shock position make it difficult to predict where a payload 5 will interact with shocks in the ambient flow outside of the cavity 2.

The application of the described shock stabilisers 7 therefore tend to support payload 5 release and reduces adverse acoustic effects in cavity flows by inducing mixing.

A traditional spoiler for deflecting fluidic flow and consequently raising the shear layer may also be present in the region of the leading edge 14 of the cavity 2. For example, a spoiler may be installed forward of the leading edge 14. A traditional spoiler is generally disposed across a cavity 2, i.e. arranged along the transverse axis relative to the impinging main flow 3. Example advantageous spoiler designs are found in GB patent GB2514453.

The four shock stabilisers 7 are illustrated as being equidistantly spaced apart along the length of the cavity 2. However, in other embodiments, the shock stabilisers 7 may be irregularly spaced. At a minimum, the shock stabilisers 7 are spaced apart by a distance equal to the maximum height of the shock stabiliser 7.

While four shock stabilisers 7 are illustrated on either side of the cavity 2, in other embodiments there may be one or more shock stabilisers 7 present on either side of the cavity 2. Preferably, there are between (inclusive) three and six shock stabilisers 7 on either side of the cavity 2. However, in some embodiments there may be more shock stabilisers 7 than this on either side of the cavity 2, for example up to 20 on either side. The shock stabilisers 7 on one side 12 of the cavity 2 are illustrated as being positioned directly opposite those on the other side 12 of the cavity 2, i.e. the same distance from the front edge 14 of the cavity. In other embodiments, the shock stabilisers 7 on opposite sides 18 of the cavity 12 are not positioned opposite each other, i.e. Shock stabilisers 7 within each pair may be offset from each other along the longitudinal axis of the bay 100.

Operation of the bay 100 will now be described with reference to FIGS. 2*a* and 2*b*. Here, a fighter aircraft 200 having the bay 100 is illustrated, although it would be appreciated the bay 100 may be installed in other forms of vehicle. The bay 100 is shown in cross-section while the rest of the aircraft 200 is shown in schematic form.

FIG. 2*a* shows the bay 100 in a closed configuration. Here, the side of the bay 100 having the opening, i.e. the aperture defined by the edges 14, 16, 18 of the cavity 2, faces the inside of the aircraft 200. The outer surface of the base 1 of the bay 100 faces toward the ambient atmosphere outside of the aircraft 200.

The bay 100 is shown installed in the ventral fuselage of the aircraft 200. The bay 100 may instead be installed in the fuselage shoulders, or in the wings of the aircraft 200.

A shaft 11 couples the bay 100 at the pivot point 6 to a motor 9. The motor 9 is for example an electric motor. When activated, the motor 9 drives the shaft 11 to rotate and in so doing open or close the bay 100. In other embodiments, the motor 9 may be directly coupled to the pivot point 6. In other embodiments again, bay 100 may comprise the motor 9 that is mechanically coupled to a fixed point in the body of the aircraft 200. In use, the bay 100 may arranged to extend out into the surrounding flow or be drawn inside the aircraft 200 before rotating into the open configuration. The bay 100 may translate and rotate simultaneously. Alternatively, the bay 100 may be arranged to rotate about one axis 4 only.

The outer edges of the base 1 may form a relatively tight seal with the skin of the aircraft 200 surrounding the bay 100 when in the closed configuration. The base 1 may extend beyond the shape defined by the outer surface of the walls 8, 10, 12, of the bay 100. In other words, the external surface of the base 1 may be conformal with the skin of the aircraft 200.

FIG. 2*b* illustrates the bay 100 in an open configuration. Here, the motor 9 has driven the bay 100 to rotate such that the cavity 2 opening is facing toward the ambient atmosphere to expose the payload 5. The shock stabilisers 7 coupled to the side walls 18 of the bay 100 are therefore shown protruding into the ambient airflow.

It would be understood that particular design features would be dependent on the cavity system and its operational environment, i.e. air, land or sea. The shock stabiliser 7 orientation, height, geometry of the pinnacle and the cross-sectional profile will be optimised to support its purpose. Several shock stabiliser 7 designs will now be described with reference to FIGS. 3*a* to 3*d*. While each of these designs tends to have intrinsic advantages, the concept is not necessarily limited to these designs and other shock stabiliser 7 designs are expected to fall within the inventive concept.

In these Figures, shock stabilisers 7 are shown having an inboard panel 71 facing towards the cavity 2, an outboard panel 72 facing towards impinging cross-flow 13, a front panel 73 facing generally towards the intended direction of travel of the bay 100 (into the main flow 3), and a rear panel 74 facing generally away from the intended direction of travel of the bay 100. Rather than the sharp edges of the shock stabilisers 7 shown in FIG. 1, the shock stabilisers 7 in FIGS. 3a-d are multi-faceted. While the shock stabilisers 7 are illustrated and described as comprising discrete joined panels, they may instead by integrally formed.

Figure 3A:
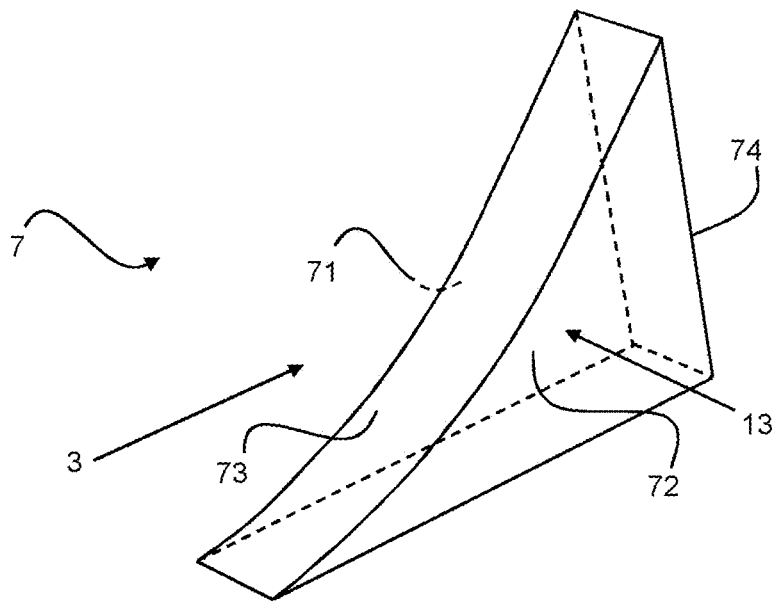
FIGS. 3a to 3d are perspective views of different designs of shock stabilisers according to embodiments.

FIG. 3a illustrates a shock stabiliser 7 in the form of a "ski slope". The stabiliser 7 comprises an inboard panel 71 whose plane is orthogonal to the surface to which the shock stabiliser 7 is attached. In other words, in the illustrated embodiment, the inboard panel 71 comprises a vertical plane parallel with the plane of the cavity side wall 12. Here, the outboard panel 72 is parallel with and offset from the inboard panel 71 in the transverse direction. The inboard and outboard panels 71, 72 are planar.

The front panel 73 is connected to the front edges of each of the inboard and outboard panels 71, 72, while the rear panel 74 is connected to the rear edges of the inboard and outboard panels 71, 72. The front panel 73 comprises a curved face presented to the main flow 3. The front panel 73 is concave, such panel curves inward towards to the rear of the shock stabiliser 7. While in the illustrated embodiment the front panel 73 is shown being orthogonal to the direction of travel of the cavity, i.e. face-on to the impinging main flow 3, in other embodiments the front panel 73 is orientated relative to the main flow 3. In a preferred embodiment, the front panel 73 is arranged such that its surface is orientated at between 5 and 20 degrees to the direction of the main flow 3. More preferably, the front panel 73 is arranged such that its surface is orientated at between 5 and 10 degrees to the direction of the main flow 3. This increases the surface area of the shock stabiliser 7 that interacts with the cross-flow 13.

The rear panel 74 is planar and arranged vertically relative to the surface to which the shock stabiliser 7 is attached. However, in other embodiments the rear panel 74 may be curved in the same way as the front panel 73, or it may be planar and sloped relative to the surface to which the shock stabiliser 7 is attached. The rear panel 74 takes a rectangular form.

Figure 3B:
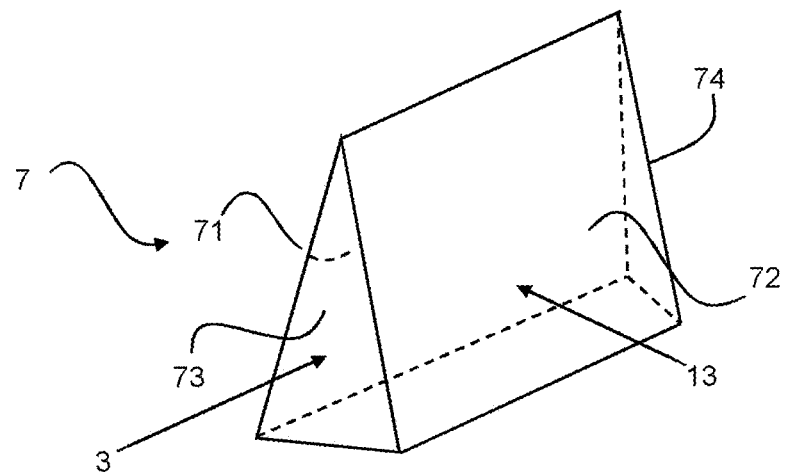

FIG. 3b illustrates a shock stabiliser 7 similar to that shown in FIG. 1, albeit extended in direction of the main flow 3. The front panel 73 and rear panel 74 of the shock stabiliser 7 take the form of an isosceles triangle. In another embodiment, the front panel 73 and rear panel 74 of the shock stabiliser 7 take the form of an equilateral triangle. The front panel 73 and rear panel 74 are of the same height and width as each other. The base edges of the front panel 73 and rear panel 74 are not parallel to each other, and instead tend to point toward each other. In another embodiment, the base edges of the front panel 73 and rear panel 74 are parallel with each other. While generally vertical, the front panel 73 and rear panel 74 are inclined inward such that they form an acute angle with the edge 18 of the cavity 2. The inboard sides of the front panel 73 and rear panel 74 are further apart than the outboard sides.

The outboard panel 72 is rectangular or square in profile, and is coupled to the outboard side of each of the front panel 73 and rear panel 74. The inboard panel 71 is generally rectangular in profile and has a larger surface area than that of the outboard panel 72. The inboard and outboard panels 73, 74 slope toward each other to meet at an apex. The apex is therefore an elongate peak. The base of the shock stabiliser 7 is trapezoidal in shape. In embodiments where the front panel 73 and rear panel 74 are parallel to each other, the base forms a parallelogram (such as a square or rectangle).

While the upper edge of the shock stabiliser 7 (i.e. the side of the shock stabiliser 7 where the inboard panel 71 and outboard panel 72 meet) is illustrated as being parallel with the upper surface of the cavity side walls 18, due to the front panel 73 and rear panel 74 being the same height, it may instead slope such that the profile of the shock stabiliser 7 reduces in height along its length (i.e. with distance from the front edge 14 of the cavity 2).

Figure 3C:
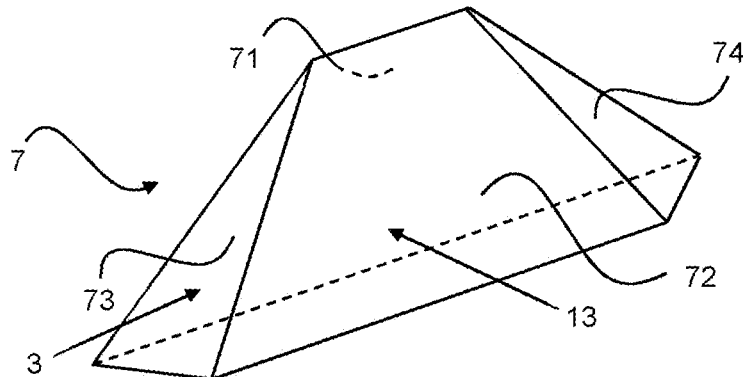

FIG. 3c illustrates a shock stabiliser 7 similar in design to the shock stabiliser 7 of FIG. 3b and common description will not be repeated. Here, the front panel 73 and rear panel 74 are inclined relative to the vertical axis and are arranged at an acute angle relative to the edge 18 of the cavity 2. Preferably, the panels 74 are orientated at about between 30 degrees and 60 degrees to both axes, and more preferably at about 45 degrees to both axes. Therefore, the inboard panel 71 and outboard panel 72 connecting the front panel 73 and rear panel 74 are trapezoidal in profile.

By angling the front panel 73 and rear panel 74 with respect to the horizontal axis and with respect to the vertical axis, a linear ramp tends to be provided to increase the volume of attached flow on the ridge line (i.e. the apex), generating a small vortex to increase mixing.

Figure 3D:
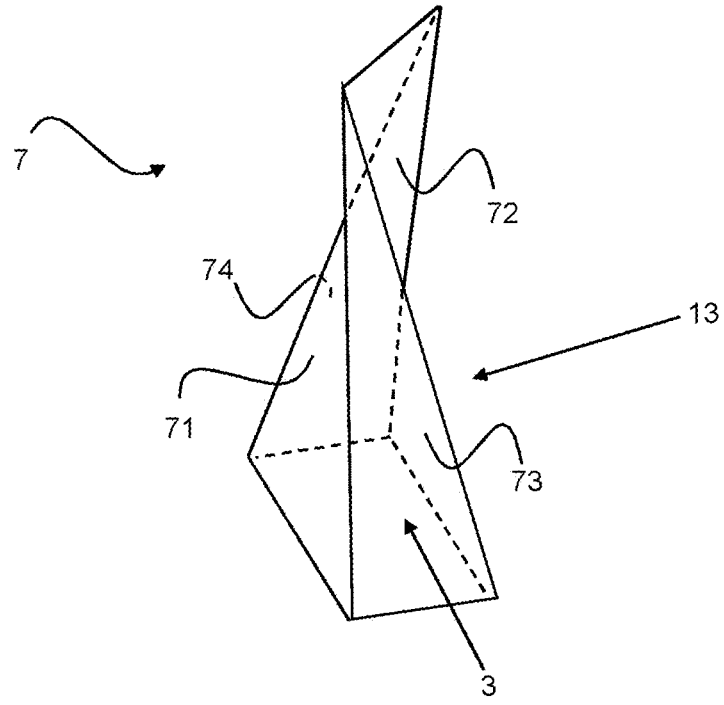

FIG. 3d illustrates a shock stabiliser 7 that is twisted about its vertical axis (i.e. the axis orthogonal to the surface to which the shock stabiliser 7 is attached). The front panel 73 and rear panel 74 take a generally triangular form, similar to the shock stabiliser 7 of FIG. 3c. The inboard panel 71 and outboard panel 72 take a trapezoidal form in a preferred embodiment, although they may take a rectangular or square form.

Here, the bottom edges of the front 73 and rear 74 panels are parallel with each other in the horizontal plane (i.e. the plane of the surface to which the shock stabiliser 7 is attached). The front 73 and rear 74 panels are joined together by the inboard panel 71 and the outboard panel 72. Therefore, the base of the shock stabiliser 7 defined by the panels 71, 72, 73, 74 is generally rectangular. However, in other embodiments the front panel 73 and rear panel 74 may be inclined towards each other in the horizontal plane, making the base trapezoidal.

The inboard 71 and outboard 72 panels incline inwards relative to the vertical plane and meet at an apex (i.e. defining an upper edge of the shock stabiliser 7). The apex is angled relative to the edge 18 of the cavity 2 in the horizontal plane (i.e. zero vertical inclination). In other words, the upper edge of the shock stabiliser 7 is not parallel with the cavity edge 18. The apex of the shock stabiliser 7 is angled at about 20 degrees relative to the edge 18 of the cavity 2, such that its leading end is closer to the edge 18 than its trailing end. This therefore results in the inboard panel 71 and outboard panel 72 being torqued (i.e. twisted and deformed). Axes through the apexes of the triangles forming the front panel 73 and rear panel 74, perpendicular to the plane of respective panels 73, 74, are not co-axial. Axes passing through the ends of the bottom edges of the front panel 73 and rear panel 74 and second outboard surfaces (i.e. the axes are the bottom edges of the inboard panel 71 and outboard panel 72) are arranged obliquely to the axis of the apex.

While in a preferred embodiment the axis of the apex of the shock stabiliser 7 is angled at about 20 degrees to the edge 18 of the cavity 2 (with no inclination or declination), the axis of the apex (i.e. the top edge of the shock stabiliser 7) may be angled at between about 5 degrees and 45 degrees to the edge 18 and more preferably between about 10 degrees and 30 degrees to the edge 18.

This design tends to show particular advantage in controlling the fluidic flow impinging on the bay 100. It has been found that the twisted inboard panel 71 tends to draw generated vortices toward to outer edges 14, 16, 18 of the cavity 2. In other words, the shear layer tends to be raised out of the cavity 2.

In other words, the shock stabiliser 7 has been seen to control the flow on the outer edges 14, 16, 18 of the cavity 2 by inducing and holding a vortex there. This vortex then acts as a virtual barrier, preventing external flow falling into the cavity 2 and wrapping it into the vortex itself. The removal of cross-flow then removes its disturbance to the shear layer, allowing it to grow in height more uniformly across the width of the cavity 2. Therefore, payloads 5 and other components within the cavity 2 co-located at the side wall 12 are better protected. The ridge line (i.e. apex) angle is designed to shed the vortex with a directional component away from the cavity 2. This is to prevent the vortex dropping in to the cavity 2.

Further designs not illustrated may include shock stabilisers 7 having multiple peaks to increase shear layer mixing. The shock stabilisers 7 may be cylindrical. Alternatively again, the shock stabilisers may be cuboid. It would be appreciated that combinations of these designs of shock stabilisers 7, and those shown in the Figures, fall within the scope of the disclosure. For example, the design of the shock stabiliser 7 in FIG. 3*c* may have a flat top, rather than sharp apex, to be more cuboidal in nature. Further, a twist may be introduced along the vertical axis of the pyramidal design shown in FIG. 1 (i.e. the axis perpendicular to the surface to which the shock stabiliser is attached), to skew the inboard panel similar to that of FIG. 3*d*.

While the cavity 2 is illustrated as having a rectangular base 1 and being defined by vertical side walls 12, a vertical aft wall 10 and a sloping front wall 8, it would be appreciated that the shock stabilisers 7 are applicable to other cavity 2 shapes. For example, all walls 8, 10, 12 may be vertically arranged relative to the horizontal base 1, or some or all of the walls 8, 10, 12 may be arranged at an acute angle relative to the horizontal base 1. The cavity 2 may comprise a circular base 1, triangular base 1, square base 1 or an irregularly shaped base 1. In other words, one of the front wall 8 and rear wall 10 may not be present, for example where the base 1 is triangular; i.e. the longitudinal walls 12 may be inclined inwards towards each other.

While the embodiments described above relate to a rotary payload bay 100 having shock stabilisers 7 suitable for use on an aircraft 200, such as a civil airliner, military fighter jet or a helicopter, in other embodiments the shock stabilisers 7 are suitable for use on other forms of bay 100 and with other forms of vehicle. For example, the bay 100 may be a wheel well, the inside of a car (i.e. the opening of the cavity 2 may be a window or sunroof), open superstructure, or any other bay 100 moving through fluid or with fluid moving past it. The rotary payload bay 100 is applicable to land vehicles such as trains and high performance cars, and naval vessels such as yachts and submarines.

The bay 100 may be fixed (i.e. static) instead of rotary and therefore may be persistently open or comprise hinged doors. The shock stabilisers 7 may be attached to the free ends of the hinged doors.

Alternatively, the shock stabilisers 7 may be motorised and arranged to descend into their own cavities when the bay

100 is closed. In other words, the shock stabilisers 7 may descend into the walls 12 of the bay 100, or the surface surrounding the cavity 2. The shock stabilisers 7 may be driven upwards to extend into the ambient flow when the bay 100 is open.

The cavity 2 opening may be formed by the skin of a vehicle i.e. aircraft 200. In other words, the cavity 2 may not have walls 8, 10, 12 as such, but be integrally formed with the vehicle.

Alternatively again, the shock stabilisers 7 may be hinged to fold into the cavity 2 when the bay 100 is closed (i.e. when its doors are closed) or out of the cavity 2 into the cross-flow 13 when the bay 100 is open.

While the ambient fluid through which the bay 100 is moving is described above as flowing air (i.e. airflow), it may instead be water.

While the bay 100 is shown as being rectangular in cross-section along its longitudinal axis (i.e. where the base 1 and two side walls 12 meet at right angles), it would be appreciated that the present disclosure covers other bay designs, such as those having semi-circular cross-sections. While such a design would effectively have one continuous side wall 12, it would have two upper surfaces to which shock stabilisers 7 are attached.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Adjacent shock stabilisers 7 may take different forms to each other.

Singular references do not exclude a plurality; thus, references to 'a', 'an', 'first', 'second', etc. do not preclude a plurality. In the claims, the terms "comprising" or "including" do not exclude the presence of other elements.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can in therefore be absent, other embodiments.

The invention claimed is:

1. A cavity system for use on a vehicle, comprising:
   a cavity having at least one of a front edge and a rear edge arranged orthogonally to the actual or intended direction of travel of the vehicle, and longitudinal edges, the front and/or rear and longitudinal edges defining an opening; and
   at least one shock stabiliser protruding from a surface adjacent each longitudinal edge of the cavity into an ambient flow outside of the cavity, the at least one shock stabiliser comprising an inboard surface facing toward the cavity, a front surface facing toward the actual or intended direction of travel of the vehicle, and a rear surface facing away from the actual or intended direction of travel of the vehicle, wherein the front surface and the rear surface are inclined from their bases toward each other and coupled to respective edges of the inboard surface.

2. The cavity system according to claim 1, further comprising a bay having a front wall, a rear wall and at least one side wall, upper surfaces of which respectively comprising the front edge, the rear edge and the longitudinal edges, where the at least one shock stabiliser is disposed on the at least one side wall.

3. The cavity system according to claim 2, wherein the bay is a rotary payload bay.

4. The cavity system according to claim 1, wherein each shock stabiliser comprises a plurality of peaks.

5. The cavity system according to claim 1, wherein the at least one shock stabiliser further comprises an outboard surface facing away from the cavity and disposed between the front surface and the rear surface, wherein the front surface and the rear surface are coupled to respective edges of the outboard surface.

6. The cavity system according to claim 1, wherein at least a portion of the inboard surface abuts a vertical plane through a longitudinal edge of the cavity.

7. The cavity system according to claim 1, wherein the the front surface and the rear surface are inclined relative to each other about the horizontal axis and vertical axis of the shock stabiliser.

8. The cavity system according to claim 1, wherein the inboard surface is arranged in parallel with a longitudinal edge of the cavity.

9. The cavity system according to claim 5, wherein the inboard surface and the outboard surface are inclined from their bases toward each other.

10. The cavity system according to claim 7, wherein the at least one shock stabiliser comprises a linear upper edge angled towards a base of the shock stabiliser, such that a height profile of the shock stabiliser reduces along its length.

11. The cavity system according to claim 5, wherein the at least one shock stabiliser comprises a linear upper edge angled away from a vertical plane passing through a longitudinal edge of the cavity, such that the linear upper edge increases in separation from the longitudinal edge of the cavity along its length.

12. The cavity system according to claim 11, wherein the linear upper edge of the at least one shock stabiliser and the longitudinal edge of the cavity are arranged such that an angle of between 5 degrees and 45 degrees is formed between them.

13. The cavity system according to claim 11, wherein the linear upper edge of the shock stabiliser is arranged obliquely with bottom edges of the inboard surface and the outboard surface, such that the outboard surface and the inboard surface are twisted about a vertical axis.

14. The cavity system according to claim 1, wherein the at least one shock stabiliser comprises an outboard surface facing away from the cavity, wherein the front surface is concave in profile such that the shock stabiliser forms a ramp to oncoming fluidic flow in the actual or intended direction of travel of the vehicle.

15. The cavity system according to claim 1, further comprising a motor for driving the at least one shock stabiliser to ascend from or descend into the surface adjacent the longitudinal edge of the cavity.

16. The cavity system according to claim 1, further comprising a motor and the at least one shock stabiliser comprises a hinge coupled in proximity to the longitudinal edge of the cavity, wherein the motor is arranged to drive the at least one shock stabiliser to rotate about the hinge to be positioned in the ambient flow when in use.

17. The cavity system according to claim 1, wherein the at least one shock stabiliser is between 2 cm and 20 cm tall.

18. The cavity system according to claim 1, wherein there are between three and six shock stabilisers aligned as viewed from a direction of the actual or intended direction of travel of the vehicle.

19. The cavity system according to claim 2, wherein there are a plurality of shock stabilisers arranged in pairs, wherein one shock stabiliser in each pair of shock stabilisers is arranged on a side wall on opposite side of the cavity to the other.

20. An aircraft comprising the cavity system according to claim 1.

* * * * *